July 16, 1940. G. T. STANTON ET AL 2,208,202
CAN INSPECTION SYSTEM
Filed May 25, 1938 3 Sheets-Sheet 1

INVENTORS: G.T. STANTON
J. E. TWEEDDALE
BY
G.K. Heydt.
ATTORNEY

July 16, 1940.  G. T. STANTON ET AL  2,208,202
CAN INSPECTION SYSTEM
Filed May 25, 1938   3 Sheets-Sheet 3

INVENTORS: G. T. STANTON
J. E. TWEEDDALE
BY
ATTORNEY

Patented July 16, 1940

2,208,202

UNITED STATES PATENT OFFICE 2,208,202

CAN INSPECTION SYSTEM

George T. Stanton, Scarsdale, and John E. Tweeddale, New Rochelle, N. Y., assignors to Electrical Research Products, Inc., New York, N. Y., a corporation of Delaware Application May 25, 1938, Serial No. 210,088

15 Claims. (Cl. 209—72)

This invention relates to can inspection systems and more particularly to systems for detecting the presence of small undesired particles in a can filled with a fluid.

Evaporated milk is a thick fluid which is usually put up in small cans, which are soldered so as to be air-tight. In the soldering operation, occasionally a small particle of solder is drawn into the can and forms a small pellet in the fluid.

The object of the present invention is a device for detecting the presence of small pellets of solder in a can and to reject all cans having pellets of appreciable size.

A feature of the invention is an acoustically damped runway down which the cans roll under the attraction of gravity.

Another feature is an acoustic detector located in the runway at a point where extraneous acoustic vibrations are substantially eliminated.

Another feature is an acoustic detector sensitive to the sounds produced by the pellets in a can.

Another feature is a movable portion of the runway under the control of the acoustic detector for dropping the cans into a reject chute.

Another feature is a curved entrance to the reject chute having the shape of the trajectory of flight of the cans at the point of rejection.

A further feature is a restoring switch in the reject chute.

The invention has been illustrated and described in connection with the inspection of cans filled with evaporated milk and the rejection of cans containing pellets of solder, but the invention is not limited to this specific use, as the device may be used for the inspection of any suitable container filled with any fluid and the detection of any undesired hard particles in the fluid.

Figure 1:
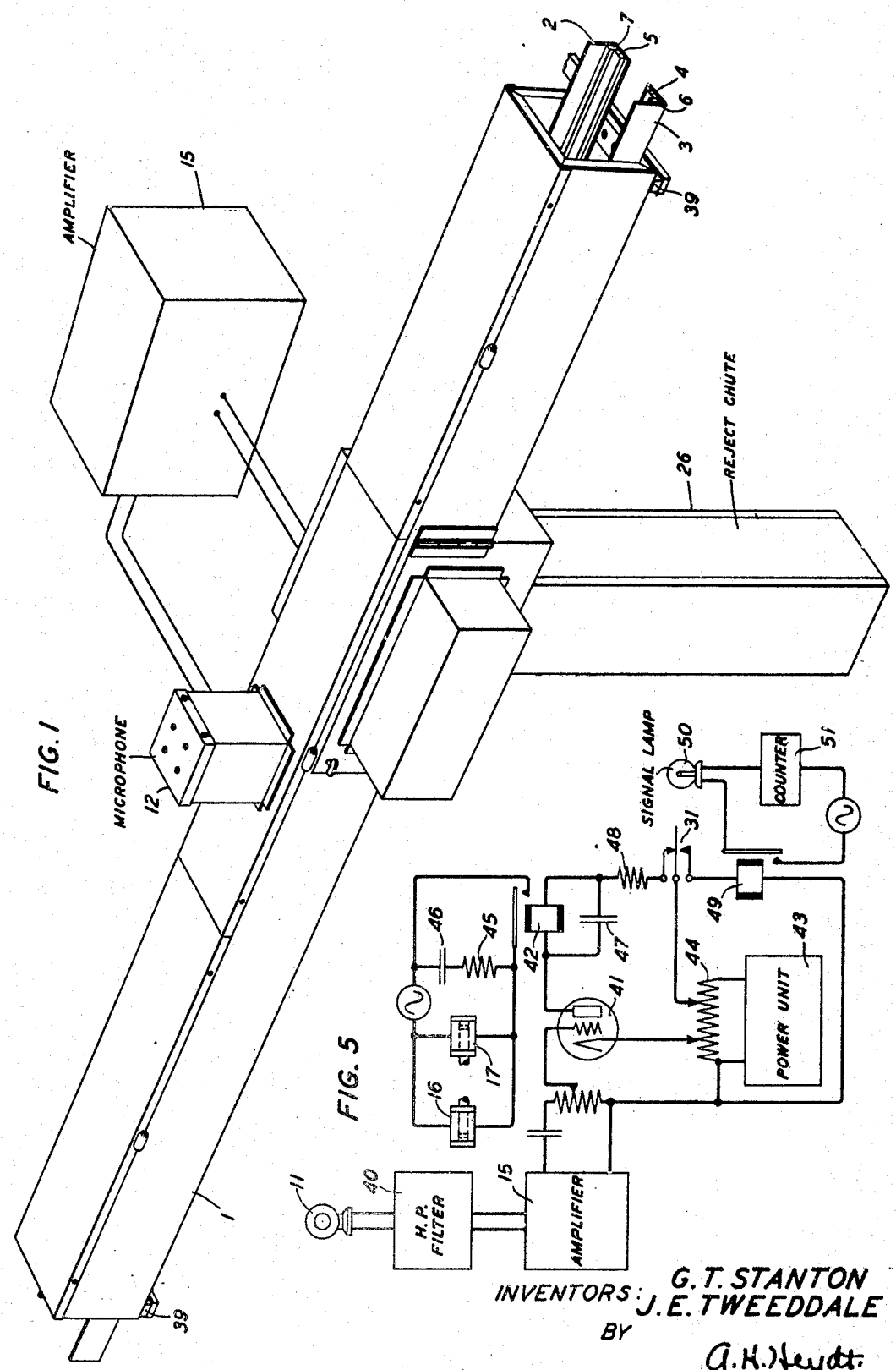
Fig. 1 is a front projection, partly diagrammatic, of a device embodying the invention.

Fig. 5 diagrammatically shows the control circuit.

The same elements in the various figures are designated by the same reference numerals.

The filled cans are permitted to roll down a runway inside the casing 1 formed of angle iron supports 2, 3 lined with suitable material. The bottom lining 4, 5 may be a thin-walled rubber tube, but then the service life will be rather short, and it will generally be found that sponge rubber or soft rubber about one-quarter inch to one-half inch thick will be more satisfactory. The side rails 6, 7 may be made of felt covered wood slats, or soft rubber, or preferably a strip of the substance known as linoleum.

The entire runway is enclosed in an acoustic tunnel or filter formed in the casing 1, for excluding and absorbing acoustic vibrations of the frequencies emitted by the particles, which in the case of solder pellets in tinplate cans are most prominent above 5000 cycles per second. The lining of the tunnel should not only absorb the vibrations due to extraneous disturbances in the factory transmitted by the air in the tunnel, but should also absorb any such vibrations transmitted through the material of the casing 1. Another effect of the absorption of acoustic vibrations in the tunnel is to limit the area in the tunnel in which the detector is responsive to the sound of the pellets in the can, and thus to localize the position of the can at which it is inspected.

Figure 2:
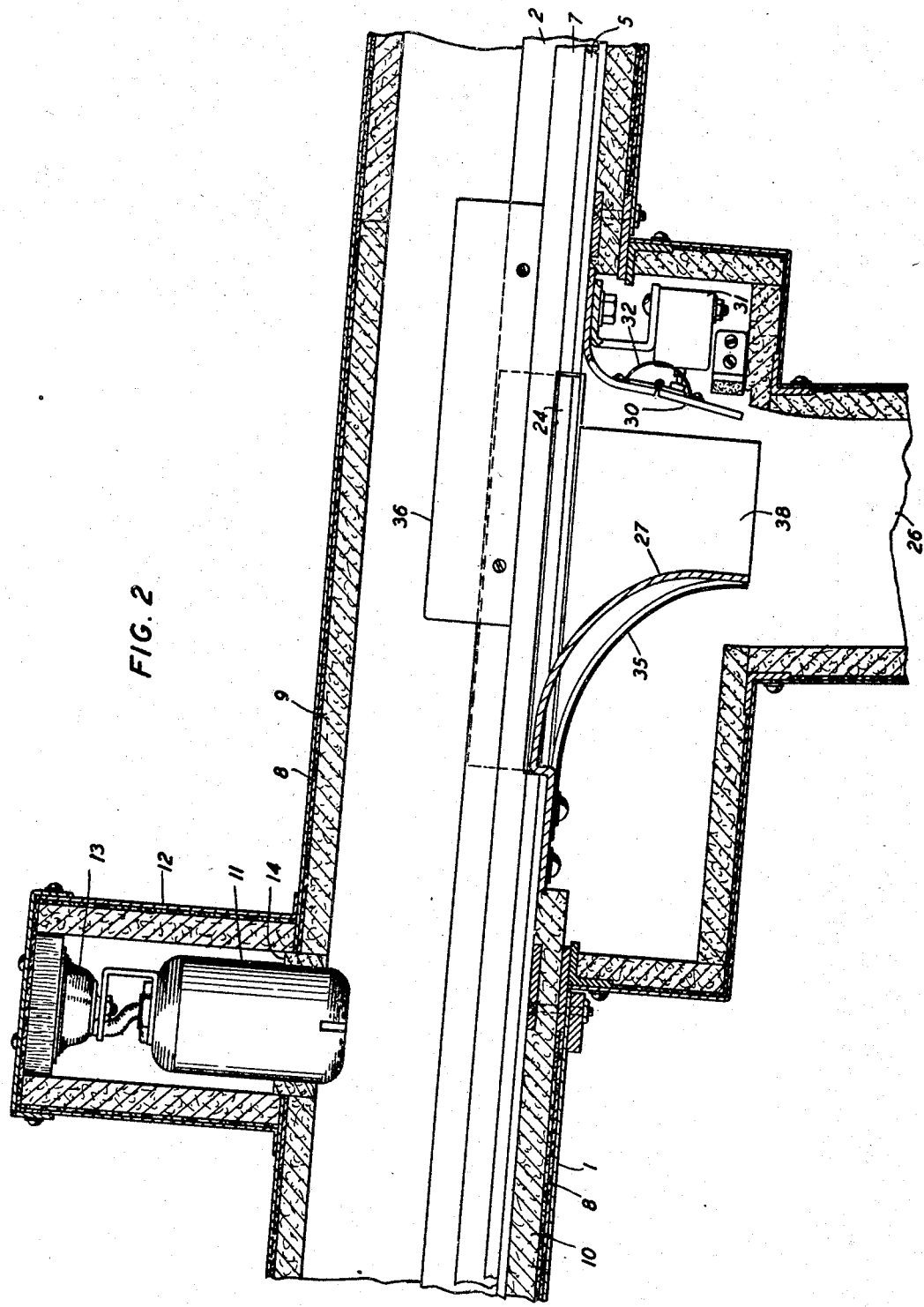
Fig. 2 is a central section showing the acoustic detector and reject chute.

The casing 1 may be made of sheet metal suitably finished to reduce rusting and improve the appearance. As shown in Fig. 2, the interior of casing 1 may be lined with some suitable acoustic absorbing materials such as the commercial products known as "celotex" or "silento" felt cemented to the sheet metal. An air space may be formed next to this lining on the top and sides of the tunnel, but this precaution is not generally necessary, and the top and sides of the tunnel may be lined with a rock wool or similar acoustic absorbing sheet such as the material known as "air acoustic" sheet 9 placed on top of the "silento" felt, without any air space. As the cans coming from the conveyor may be wet, the bottom of the casing may be lined with a water resistant damping material, such as asphalt saturated "celotex" 10, the angle iron runway 2, 3 resting on this lining. With a casing insulated as described above, sufficient reduction in the magnitude of the extraneous acoustic disturbances may generally be obtained with a casing of about 6 to 10 feet in length, with the detector 11 located near the center of the casing.

To reduce the transfer of shocks or other mechanical vibrations to the mechanism in the casing 1, the casing 1 is preferably resiliently supported, as by the rubber supports 39, and mechanically isolated from the tracks leading to and from the casing 1.

The acoustic detector may be a microphone 11 which should be stable, quiet and sensitive to high frequencies, mounted in a small compartment 12 attached to the casing 1, and lined with the same materials as the casing 1. In order to prevent the transmission of mechanical vibrations the microphone 11 is suspended from a rubber cup or support 13 attached to the compartment 12 and is steadied by a close fitting ring 14 of felt or sponge rubber. The top of the compartment 12 may be made removable so that the microphone 11 may be removed for repairs or replacement.

In a can filled with a fluid and containing a pellet, the force of gravity acting on the pellet will tend to maintain the pellet at the lowest point of the inner surface of the can. As the can rolls down the runway the pellet rubs against the inner surface of the can and produces a characteristic high frequency sound. Pellets in a can may be detected with the can rolling at any velocity less than the velocity at which the pellet ceases to move with respect to the surface of the can. To provide sufficient spacing between cans to permit the rejection of defective cans without interference with adjacent ones, the velocity should be as large as possible consistent with proper detection. It has been found that, if the velocity of the can is changing, that is, accelerating or decelerating, as the can passes the detector, the critical velocity is increased and more cans can be tested. By adjusting the slope of the casing, velocities as high as 40 inches per second may be employed and about 170 cans per minute may be tested. The slope of the casing required to produce any desired condition will depend also upon the velocity of the can as it enters the casing.

In Fig. 5, the electric currents from the microphone 11 are amplified in an amplifier 15 of conventional design but capable of amplifying currents in the upper audio frequency range. As the sounds emitted by the particles in the cans have prominent components of about 5000 cycles per second or higher, while the sounds produced by the rolling of the can down the runway are mainly of lower frequency, a high-pass filter 40 having a cut-off frequency of two or three thousand cycles per second may be intercalated in the amplifier circuit. The electrical filter 40 in the amplifier circuit complements the acoustic filter formed by the lining of the casing 1 to increase the discrimination between the high frequency sound due to the pellet, and low frequency sounds due to the rolling of the can down the runway, the splashing of the fluid in the can, the vibration and noise of the conveyor machinery and the general noise in the factory transmitted along or through the acoustic filter formed by the casing 1. In a quiet location, where the extraneous noise level is quite low, the filtering may be reduced either by the omission of the electrical filter or by a reduction in the thickness of the acoustic lining of the casing. The output of the amplifier is supplied to a control device, which may be a vacuum tube biased past the cut-off point, or a gas-filled grid controlled tube 41, commonly known as a "trigger" tube.

When the amplified output to the gas-filled tube 41 exceeds a predetermined value, the gas-filled tube breaks down and operates a relay 42 connected in the anode circuit. The relay closes the circuit to the solenoids 16, 17 in Figs. 3 and 4. The solenoids attract their armatures 18 and 19, retracting movable portions 24, 25 of the angle-iron runway against the restoring springs 20, 21 and 22, 23 and drawing back the portions 28, 29 of the track under the can. The rejected can is thus free to drop out of the runway into the reject chute 26. The entrance guide 27 to the reject chute 26, as shown in Fig. 2, is curved to the trajectory of the cans, so that the rejected can will drop with the least noise and friction and the minimum consumption of time. The rejected can while dropping into the reject chute 26 presses against the plate 30 which opens a switch 31 in the anode circuit of the gas-filled tube 41, opening the anode circuit, and restoring the control of the grid over the tube, releasing the relay 42 and deenergizing the solenoids 16, 17 thus permitting the springs 20, 21 and 22, 23 to restore the movable part of the runway. After the can has passed, the spring 32 restores the plate 30 to its original position and recloses the switch 31 reapplying potential to the anode of the tube.

The gas-filled tube 41 is energized by power from some convenient power unit 43, which may be a battery, or a rectifier and filter energized by alternating current. A potentiometer 44 may be connected across the output of the power unit 43, and affords a convenient means of adjusting the grid and anode potentials of the tube 41. A resistor 45 and capacitor 46 may be shunted across the contacts of the relay 42 to reduce sparking. A capacitor 47 shunted across the winding of the relay 42 assists in the rapid operation of the relay 42, while a ballast resistor 48 limits the discharge current through the tube 41. The solenoids 16, 17 may be energized from any suitable source, such as the ordinary alternating current power system.

When the switch 31 is operated by a rejected can, the switch 31 closes a back contact forming a circuit from the potentiometer 44 through the relay 49. Relay 49 operates and closes a circuit from some suitable power supply, such as the ordinary alternating current power system, through a signal lamp 50 and a counter 51. The counter 51 counts the number of cans rejected. The signal lamp 50 flashes as each can is rejected, and will burn steadily as an alarm signal if a can is jammed in the reject chute. The relay 49 is not essential, as the switch 31 may be provided with sufficient contacts to directly control the alarm circuit.

Figure 3:
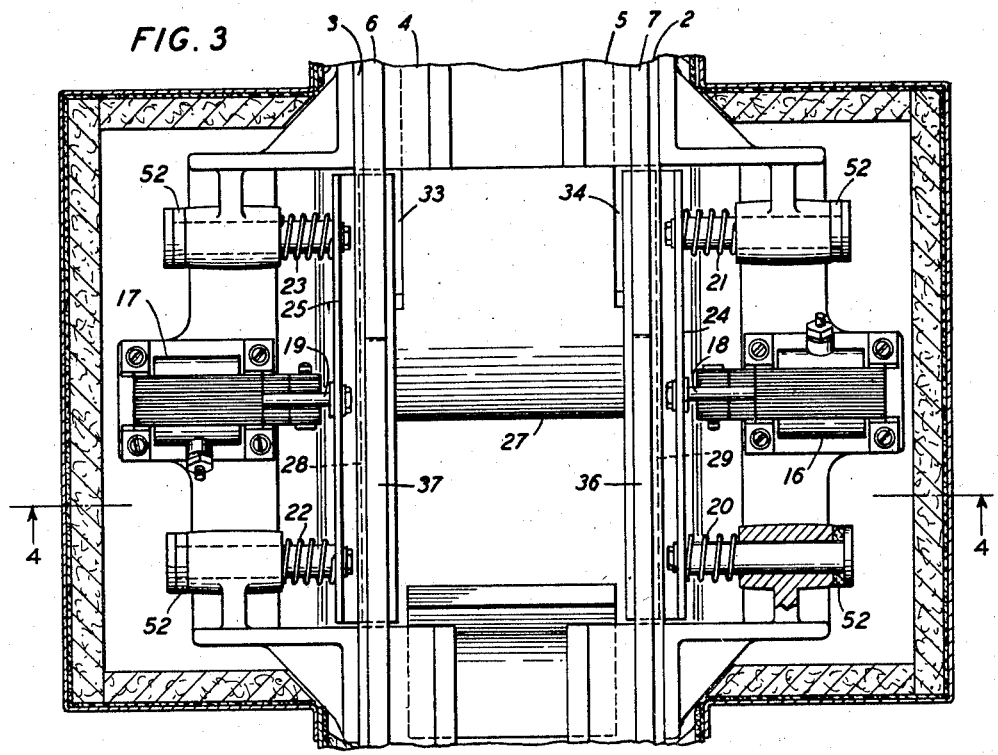
Fig. 3 is a horizontal section showing the rejecting electromagnets and the entrance to the reject chute.
Figure 4:
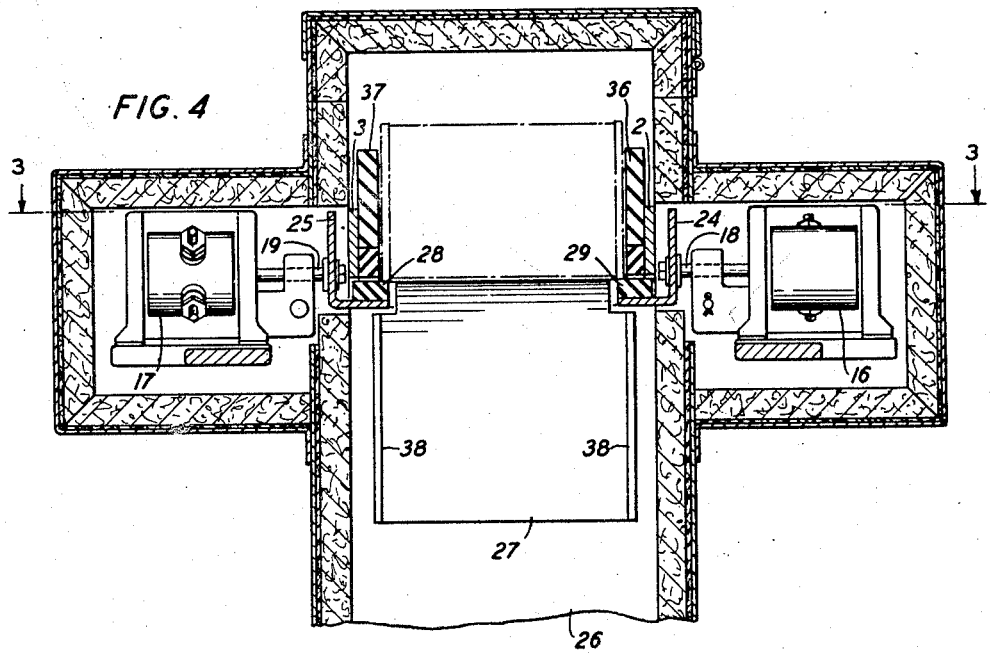
Fig. 4 is a vertical section through the center of the reject chute.

The entrance guide 27 may be cut away as shown at 33, 34, Fig. 3, to permit any water that may be in the casing 1 to drain away over the sheet 35, Fig. 2, and into the reject chute.

The operation of the solenoids 16, 17 and their restoration must not produce any acoustic or mechanical vibrations that will affect the microphone 11 after the completion of the rejection of a can and the restoration of switch 31. The solenoids are therefore contained in compartments lined with acoustic material similar to that used in the casing 1 and felt washers 52, Fig. 3, reduce the vibration produced when the retractile portion of the runway returns to normal position. The noise made by the operation and release of the solenoids does not decay instantaneously, and the inspection circuit should be held in an inoperative condition until this noise has decayed to a value which will not affect the microphone 11. The length of the plate 30, its distance below the runway and its spacing with respect to the entrance guide 27 are so proportioned as to furnish the necessary delay in the restoration of the circuit. Thus, a rejected can, falling under the control of its velocity and the attraction of gravity controls the operation, and the speed of operation of the inspection device.

As a rejected can may tend to turn slightly and jam at the entrance to the reject chute, guides 36, 37 are placed in the casing 1 to steady the can at the point of rejection, and side guides 38 are formed on the entrance guide 27.

While a preferred method of removing a rejected can from the casing 1 is described, the invention is not limited to this specific method or apparatus. The cans may be removed by many other methods, such as a switch track, which come within the scope of the invention.

What is claimed is:

1. The method of detecting the presence of solid particles in containers holding liquids, said particles being of higher specific gravity than the liquid and of sufficient hardness to coact with the surface of the container, which comprises freely rolling said containers with constantly varying velocity past an inspection point, detecting the acoustic vibrations emitted by said containers at the inspection point, selecting from said vibrations only the vibrations due to a solid particle, and converting said selected vibrations into mechanical motion to reject the container.

2. Apparatus for detecting the presence of solid particles in containers holding fluids comprising a vibration sensitive detector, a runway having an acoustically inert surface for guiding the freely rolling containers past said detector at a constantly varying velocity due to gravity, means for selectively amplifying the higher frequencies of the output of said detector, and means controlled by said amplified frequencies for rejecting containers carrying solid particles.

3. The method of detecting the presence of solid particles in a container holding liquids, said particles being of higher specific gravity than the liquid and of sufficient hardness to coact with the surface of the container, which comprises freely rolling said container to move the particles into contact with the wall of the container, thus causing relative motion between the container and its contents, detecting the acoustic vibrations emitted by said containers due to said relative motion, selecting from said vibrations only the vibrations due to a solid particle and converting said selected vibrations into mechanical motion to reject said containers.

4. Apparatus for detecting the presence of solid particles in containers holding fluids comprising an inclined runway having an acoustically inert surface for guiding the freely rolling containers, said runway being of sufficient length that the rotation of the containers will move the particles into contact with the walls of the container, an acoustic detector mounted in close proximity to said runway at a point of relative motion between the container and the contents, means for selecting from the output of said detector the vibrations due to a particle in a container, and means for converting said selected vibrations into mechanical motion to reject containers carrying solid particles.

5. Apparatus for detecting the presence of solid particles in containers holding fluids comprising an inclined runway having an acoustically inert surface for guiding the freely rolling containers, a casing surrounding said runway, an acoustic detector mounted in said casing at a point of relative motion between the container and the contents, said casing being of such length and so lined with acoustic materials that air vibrations entering said casing are attenuated to a point where they do not appreciably affect said detector, and vibrations arising in said casing are selectively damped to emphasize the effect of the vibrations due to a particle on said detector, and means for converting the output of said detector into mechanical motion to reject containers carrying solid particles.

6. Apparatus for detecting the presence of solid particles in containers holding fluids comprising an inclined runway having an acoustically inert surface for guiding the freely rolling containers, an acoustically damped casing surrounding said runway, an acoustic detector mounted in said casing in close proximity to said runway, a reject chute associated with said casing, a movable portion of said runway providing access to said chute and means for converting the vibrations in the output of said detector due to a particle into mechanical motion to move the movable portion of said runway and reject the container carrying a particle into said reject chute.

7. Apparatus for detecting the presence of solid particles in containers holding fluids comprising an inclined runway having an acoustically inert surface for guiding the freely rolling containers, an acoustically damped casing surrounding said runway, an acoustic detector mounted in said casing in close proximity to said runway, a vertically disposed reject chute leading out of said casing at a point behind said detector, a retractile portion of said runway at the entrance to said chute, and means for converting the vibrations in the output of said detector due to a particle into mechanical motion to retract the portion of said runway and permit a container carrying a particle to drop into said chute.

8. Apparatus for detecting the presence of solid particles in containers holding fluids comprising an inclined runway having an acoustically inert surface for guiding the freely rolling containers, a casing surrounding said runway, a retractile portion of said runway, a vertically disposed reject chute leading out of said casing near the retractile portion of said runway, the entrance to said chute being shaped to the trajectory of the container when falling under the attraction of gravity, means in said casing for detecting the presence of a particle in a container, and means for converting the output of said detector into mechanical motion to retract the portion of said runway and permit said container to fall into said reject chute.

9. Apparatus for detecting the presence of solid particles in containers holding fluids comprising an inclined runway having an acoustically inert surface for causing the container to freely rotate, a detector located in close proximity to said runway at a point where the container is moving relative to its contents and actuated by the vibrations due to a particle, a vertically disposed reject chute leading out from said runway, means for converting the output of said detector into mechanical motion of said runway permitting a container carrying a particle to fall in said reject chute, and means in said chute for restoring said converting means actuated and timed by the free fall of said container.

10. Apparatus for detecting the presence of solid particles in containers holding fluids comprising an inclined runway for causing the container to freely rotate, a detector located in close proximity to said runway at a point where the container is moving relative to its contents, means associated with said detector for damping all vibrations except those due to a particle, a retractile portion of said runway, electromagnetic means controlled by vibrations in the output of said detector due to a particle to retract said portion of the runway, a vertical reject chute disposed under the retractile portion of said runway, the entrance to said chute being shaped to the trajectory of said container, a movable plate in the wall of said chute, a switch operated by said plate to restore said electromagnetic means, said plate being of such size and so disposed that the restoration of said means is timed by the fall of the container.

11. The method of detecting the presence of solid particles in containers holding liquids, said particles being of higher specific gravity than the liquid and of sufficient hardness to coact with the surface of the container, which comprises causing the containers to roll freely until the particles are in contact with the walls of the container, detecting only the vibrations due to a particle moving relatively to the walls of the container, converting the detected vibrations into mechanical motion, causing the container to fall under the attraction of gravity, and controlling the time of restoration of said mechanical means by the fall of the container.

12. Apparatus for detecting the presence of solid particles in containers holding fluids comprising a detector sensitive to the acoustic vibrations from a container, a runway having an acoustically inert surface for guiding the freely rolling containers past said detector at a velocity due to gravity, means for selectively amplifying the higher frequencies of the output of said detector, and means controlled by said amplified frequencies for rejecting containers carrying solid particles.

13. Apparatus for detecting the presence of solid particles in containers holding fluids comprising a runway having an acoustically inert surface for guiding the freely rolling containers, an acoustically damped casing surrounding said runway, an acoustic detector mounted in said casing, a reject chute associated with said casing, a movable portion of said runway providing access to said chute, means for converting the vibrations of said detector due to a particle into mechanical motion to move the movable portion of said runway and reject a container carrying a particle into said reject chute, and means in said chute for counting the containers rejected.

14. Apparatus for detecting the presence of solid particles in containers holding fluids comprising a runway causing the containers to freely rotate, a detector located near said runway at a point where the container is moving relative to its contents, means associated with said detector for damping all vibrations except those due to a particle, a retractile portion of said runway, electromagnetic means controlled by the output of said detector to retract said portion of the runway, a reject chute associated with said retractile portion, a movable plate in said chute of such size and so disposed that the restoration of said electromagnetic means is timed by the movement of a container in said chute, and a switch operated by said plate to restore said electromagnetic means and to close a signal circuit.

15. Apparatus for detecting the presence of solid particles in containers holding fluids of the consistency of condensed milk comprising an inclined runway having an acoustically inert surface for causing the container to freely rotate, an acoustic detector located in close proximity to said runway at a point where the container has a velocity of the order of thirty to forty inches per second, acoustic means associated with said detector to damp extraneous vibrations of the order of five thousand cycles per second and higher, a high-pass filter in the output of said detector having a cut-off frequency of the order of two thousand cycles per second, electromagnetic means controlled by the output of said detector to switch containers carrying a particle from said runway, and switching means controlled by the free fall of the rejected containers to restore said electromagnetic means.

GEORGE T. STANTON.
JOHN E. TWEEDDALE.